US012075216B2

(12) United States Patent
Zhou et al.

(10) Patent No.: US 12,075,216 B2
(45) Date of Patent: Aug. 27, 2024

(54) WIRELESS EARPHONE SYNCHRONIZATION DETECTION METHOD, APPARATUS, WIRELESS EARPHONES AND STORAGE MEDIUM

(71) Applicant: GOERTEK INC., Shandong (CN)

(72) Inventors: Leilei Zhou, Shandong (CN); Qiang Xu, Shandong (CN); Haihong Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 216 days.

(21) Appl. No.: 17/624,162

(22) PCT Filed: Dec. 28, 2019

(86) PCT No.: PCT/CN2019/129512
§ 371 (c)(1),
(2) Date: Dec. 30, 2021

(87) PCT Pub. No.: WO2021/047116
PCT Pub. Date: Mar. 18, 2021

(65) Prior Publication Data
US 2022/0353627 A1 Nov. 3, 2022

(30) Foreign Application Priority Data
Sep. 11, 2019 (CN) ......................... 201910860394.0

(51) Int. Cl.
*H04R 29/00* (2006.01)
*H04R 1/10* (2006.01)

(52) U.S. Cl.
CPC ........... *H04R 29/00* (2013.01); *H04R 1/1016* (2013.01); *H04R 2420/07* (2013.01)

(58) Field of Classification Search
CPC .. H04R 29/00; H04R 1/1016; H04R 2420/07; H04R 2201/10
(Continued)

(56) References Cited

U.S. PATENT DOCUMENTS 10,200,803 B1 2/2019 Tong et al.
2008/0226103 A1 9/2008 Schobben
(Continued)

FOREIGN PATENT DOCUMENTS

CN 101873168 10/2010
CN 103077242 5/2013
(Continued)

OTHER PUBLICATIONS

Notification to Grant Patent Right for Invention issued in Chinese Application No. 201910860394.0; mailed Nov. 10, 2020; 3 pgs.
(Continued)

*Primary Examiner* — Vivian C Chin
*Assistant Examiner* — Con P Tran
(74) *Attorney, Agent, or Firm* — HAUPTMAN HAM, LLP

(57) ABSTRACT

A method and a device for performing synchronization detection on wireless earphones, wireless earphones and a computer readable storage medium are provided. In the method, a synchronization state between a left earphone and a right earphone of the wireless earphones is acquired when the wireless earphones trigger a target action, where the target action includes any one of: entering a box, leaving a box, entering an ear, leaving an ear and connecting to a terminal; a countdown with a predetermined time duration is started in a case that the synchronization state is a non-synchronous state; and the synchronization state between the left earphone and the right earphone of the wireless earphones is acquired when the countdown ends.

3 Claims, 3 Drawing Sheets

(58) Field of Classification Search
USPC ............... 381/58, 59, 74, 87, 386, 150, 122; 455/575.1; 370/503, 507
See application file for complete search history.

(56) References Cited

U.S. PATENT DOCUMENTS

| | | | | |
|---|---|---|---|---|
| 2013/0266152 | A1* | 10/2013 | Haynie .................. | H04R 5/033 381/80 |
| 2013/0336435 | A1* | 12/2013 | Akkihal ................ | H04J 3/0673 375/356 |
| 2015/0257041 | A1 | 9/2015 | Su | |
| 2016/0357510 | A1* | 12/2016 | Watson ................... | G06F 3/162 |

FOREIGN PATENT DOCUMENTS

| | | | |
|---|---|---|---|
| CN | 104902561 | | 9/2015 |
| CN | 108200495 | | 6/2018 |
| CN | 108401217 | | 8/2018 |
| CN | 108460660 | A | 8/2018 |
| CN | 109195053 | | 1/2019 |
| CN | 109391926 | | 2/2019 |
| CN | 109660971 | A | 4/2019 |
| CN | 110505563 | | 11/2019 |
| EP | 2476263 | | 7/2012 |
| EP | 3402220 | | 11/2018 |
| JP | 2001128283 | | 5/2001 |

OTHER PUBLICATIONS

Water Made of Iron, "Automatic human ear detection for AirPods headphones" Jul. 18, 2018.
International Search Report issued in PCT/CN2019/129512 dated Jun. 5, 2020.

* cited by examiner

WIRELESS EARPHONE SYNCHRONIZATION DETECTION METHOD, APPARATUS, WIRELESS EARPHONES AND STORAGE MEDIUM

This application is a 371 Application of International Patent Application No. PCT/CN2019/129512, titled "WIRELESS EARPHONE SYNCHRONIZATION DETECTION METHOD, APPARATUS, WIRELESS EARPHONES AND STORAGE MEDIUMEARPHONESEARPHONES", filed on Dec. 28, 2019, which claims the benefit of and priority to Chinese Patent Application No. 201910860394.0 titled "WIRELESS EARPHONE SYNCHRONIZATION DETECTION METHOD, APPARATUS, WIRELESS EARPHONES AND STORAGE MEDIUMEARPHONESEARPHONES", filed on Sep. 11, 2019 with the Chinese Patent Office, which are incorporated herein by reference in their entireties.

FIELD

The present disclosure relates to the technical field of earphones, and in particular to a method and a device for performing synchronization detection on wireless earphones, wireless earphones, and a computer readable storage medium.

BACKGROUND

For wireless earphones, such as TWS (True Wireless Stereo) earphones, a music function and a call function are usually controlled by simultaneously wearing a left earphone and a right earphone. In the conventional technology, the left earphone and the right earphone are not synchronized often due to a synchronization delay between the two earphones, that is, the left earphone and the right earphone in wearing are not synchronized in real time, resulting in a control failure, and thereby affecting user experience.

Therefore, how to improve the accuracy of detecting a synchronization state between a left earphone and a right earphone is a technical problem required to be solved by those skilled in the art.

SUMMARY

According to the present disclosure, a method and a device for performing synchronization detection on wireless earphones, wireless earphones and a computer readable storage medium are provided to improve the accuracy of detecting a synchronization state between a left earphone and a right earphone.

In order to achieve the above objective, a method for performing synchronization detection on wireless earphones is provided. The method includes: acquiring a synchronization state between a left earphone and a right earphone of the wireless earphones when the wireless earphones trigger a target action, where the target action includes any one of: entering a box, leaving a box, entering an ear, leaving an ear and connecting to a terminal; starting a countdown with a predetermined time duration in a case that the synchronization state is a non-synchronous state; and acquiring the synchronization state between the left earphone and the right earphone of the wireless earphones when the countdown ends.

In an embodiment, the method further includes: in a case that the synchronization state is a synchronous state, determining a state of the wireless earphones and performing an operation corresponding to the state.

In an embodiment, in a case that the state is an entering-ear state, the performing an operation corresponding to the state includes: playing an audio and outputting the audio through the wireless earphones; or outputting a call signal through the wireless earphones and turning on a microphone of the wireless earphones; and in a case that the state is a leaving-ear state, the performing an operation corresponding to the state includes: pausing an audio; or outputting a call signal through a speaker of a terminal corresponding to the wireless earphones and turning on a microphone of the terminal.

In an embodiment, in a case that the state is an entering-box state, the performing an operation corresponding to the state includes: performing a disconnection operation on the wireless earphones; and in a case that the state is a leaving-box state, the performing an operation corresponding to the state includes: performing a connection operation on the wireless earphones.

In an embodiment, the method further includes: determining a maximum delay and a minimum delay for the synchronization detection; and determining the predetermined time duration based on the maximum delay and the minimum delay.

In an embodiment, the determining the predetermined time duration based on the maximum delay and the minimum delay includes: determining the predetermined time duration according to a predetermined inequation. The predetermined inequation is expressed as:

$$\frac{T_{min}}{2} \leq t \leq \frac{T_{max}}{2}$$

where $T_{min}$ represents the minimum delay, $T_{max}$ represents the maximum delay, and t represents the predetermined time duration.

In order to achieve the above objective, a device for performing synchronization detection on wireless earphones is provided. The device includes an acquisition module and a control module. The acquisition module is configured to acquire a synchronization state between a left earphone and a right earphone of the wireless earphones when the wireless earphones trigger a target action, where the target action includes any one of: entering a box, leaving a box, entering an ear, leaving an ear and connecting to a terminal. The control module is configured to start a countdown with a predetermined time duration in a case that the synchronization state is a non-synchronous state, and trigger the acquisition module to perform operations when the countdown ends.

In an embodiment, the device further includes an execution module. The execution module is configured to, in a case that the synchronization state is a synchronous state, determine a state of the wireless earphones and perform an operation corresponding to the state.

In an embodiment, the device further includes a first determination module and a second determination module. The first determination module is configured to determine a maximum delay and a minimum delay for the synchronization detection. The second determination module is configured to determine the predetermined time duration based on the maximum delay and the minimum delay.

In order to achieve the above objective, wireless earphones are provided. The wireless earphones include a memory and a processor. The memory stores a computer program. The processor is configured to perform, when executing the computer program, the method for performing synchronization detection on wireless earphones.

In order to achieve the above objective, a computer readable storage medium is provided. The computer readable storage medium stores a computer program. The computer program, when executed by a processor, causes the processor to perform the method for performing synchronization detection on wireless earphones.

Based on the above solutions, it can be seen that the method for performing synchronization detection on wireless earphones according to the present disclosure includes: acquiring a synchronization state between a left earphone and a right earphone of the wireless earphones when the wireless earphones trigger a target action, where the target action includes any one of: entering a box, leaving a box, entering an ear, leaving an ear and connecting to a terminal; starting a countdown with a predetermined time duration in a case that the synchronization state is a non-synchronous state; and acquiring the synchronization state between the left earphone and the right earphone of the wireless earphones when the countdown ends.

In the method for performing synchronization detection on wireless earphones according to the present disclosure, when the wireless earphones trigger a target action, synchronization detection is performed, that is, a synchronization state between a left earphone and a right earphone is acquired. In a case that the left earphone and the right earphone are not synchronized, polling is performed. Synchronization detection is performed every predetermined time duration until the left earphone and the right earphone are synchronized. Therefore, with the method for performing synchronization detection on wireless earphones according to the present disclosure, the problem of wearing detection failure caused by the delay of the synchronization of the left earphone and the right earphone in wearing is solved, ensuring that the synchronization detection can be realized in one wearing process, improving the accuracy of detecting the synchronization state between the left earphone and the right earphone, and thereby improving the user experience. A device for performing synchronization detection on wireless earphones, wireless earphones and a computer readable storage medium are further provided according to the present disclosure. With the device, the wireless earphones and the computer readable storage medium, the above technical effects can also be achieved.

It should be understood that the above general description and the following detailed description are only exemplary and do not limit the present disclosure.

BRIEF DESCRIPTION OF THE DRAWINGS

In order to more clearly describe the technical solutions in the embodiments of the present disclosure or the technical solutions in the conventional technology, the drawings to be used in the description of the embodiments or in the conventional technology are briefly described hereinafter. It is apparent that the drawings described below only show some embodiments of the present disclosure, and those skilled in the art may obtain other drawings from the provided drawings without any creative effort. The drawings described herein are intended to provide a further understanding of the present disclosure and constitute a part of the specification. The drawings and the following embodiments are intended to explain the present disclosure, and are not intended to limit the present disclosure. In the drawings.

DETAILED DESCRIPTION OF EMBODIMENTS

Hereinafter, the technical solutions according to the embodiments of the present disclosure are described clearly and completely in conjunction with the drawings in the embodiments of the present disclosure. Apparently, the embodiments described below are only some embodiments of the present disclosure, rather than all the embodiments. Any other embodiments obtained by those skilled in the art based on the embodiments of the present disclosure without any creative effort fall within the protection scope of the present disclosure.

According to an embodiment of the present disclosure, a method for performing synchronization detection on wireless earphones is provided to improve the accuracy of detecting a synchronization state between a left earphone and a right earphone.

Figure 1:
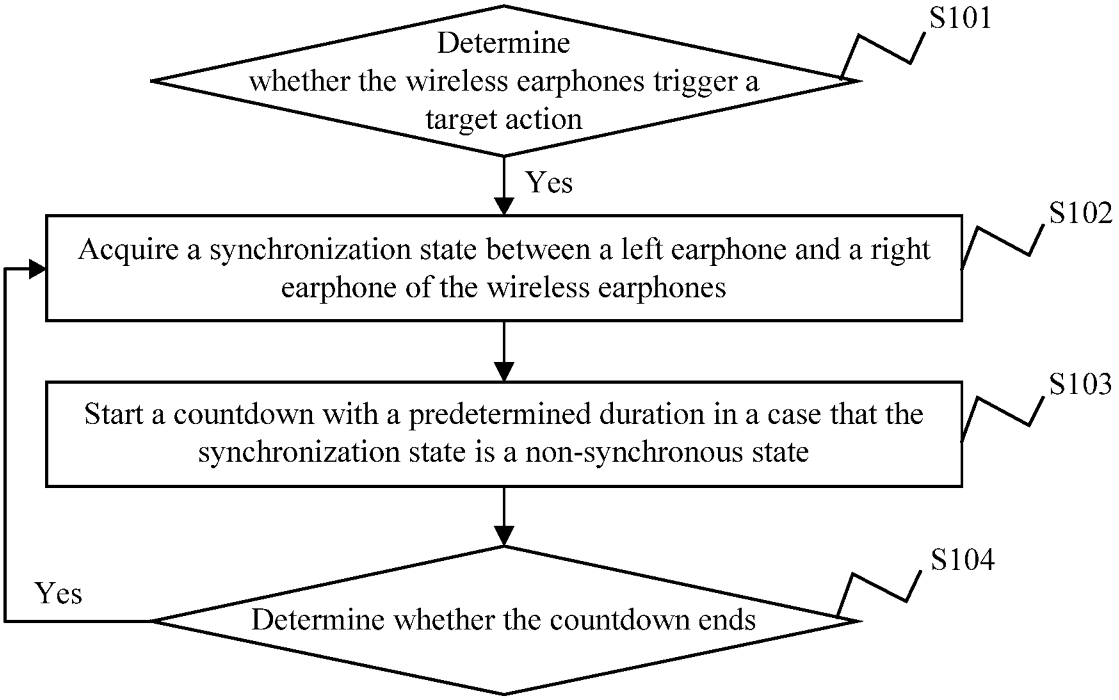
FIG. 1 is a flowchart of a method for performing synchronization detection on wireless earphones according to an exemplary embodiment.

Reference is made to FIG. 1, which shows a flowchart of a method for performing synchronization detection on wireless earphones according to an exemplary embodiment. As shown in FIG. 1, the method includes the following steps S101 to S104.

In step S101, it is determined whether the wireless earphones trigger a target action. In a case that the wireless earphones trigger the target action, proceeds to step S102. The target action includes any one of: entering a box, leaving a box, entering an ear, leaving an ear and connecting to a terminal.

The execution subject of the method in the embodiment may be a terminal connected to the wireless earphones, to perform synchronization detection on a left earphone and a right earphone of the wireless earphones. The information synchronization (peer sync) between the left earphone and the right earphone of the TWS earphones is very important. All functions are performed based on the peer sync. The synchronization detection is triggered by detecting a target action. The target action includes: entering a box, leaving a box, entering an ear, leaving an ear and connecting to a terminal.

In step S102, a synchronization state between a left earphone and a right earphone of the wireless earphones is acquired.

In this step, in a case that the target action is triggered, synchronization detection is performed on the left earphone and the right earphone of the wireless earphones, that is, the synchronization state between the left earphone and the right earphone is acquired.

In step S103, a countdown with a predetermined time duration is started in a case that the synchronization state is a non-synchronous state.

In step S104, it is determined whether the countdown ends. In a case that the countdown ends, proceed to step S102.

In the conventional technology, in a case that the peer sync has a delay, the synchronization state between the left earphone and the right earphone cannot be acquired in real time, resulting in an inaccurate synchronization state detection. Therefore, in the embodiment, in a case that the synchronization state is a non-synchronous state, a countdown with a predetermined time duration is started. When the countdown ends, the synchronization state between the left earphone and the right earphone is acquired again. That is, polling is performed with the predetermined time duration. Synchronization detection is performed every predetermined time duration to detect whether the peer sync is realized. When the peer sync is realized, the synchronization detection is stopped and an action is performed.

In the embodiment, the predetermined time duration is not limited and may be flexibly set by those skilled in the art according to actual situations. Preferably, the method in the embodiment further includes the following operations. A maximum delay and a minimum delay for the synchronization detection are determined, and the predetermined time duration is determined based on the maximum delay and the minimum delay. In implementations, the interval of the synchronization detection for detecting the synchronization state, that is, the predetermined time duration, may be determined based on the delay of the peer sync of the system. The delays of the peer syncs in different systems are different. The delays of the peer sync in a same system may be different due to the wireless earphones in different states. The maximum delay and the minimum delay of the peer sync may be determined, and the predetermined time duration is determined based on the maximum delay and the minimum delay. Preferably, the predetermined time duration may be determined based on a predetermined inequation. The inequation is expressed as:

$$\frac{T_{min}}{2} \le t \le \frac{T_{max}}{2}$$

where $T_{min}$ represents the minimum delay, $T_{max}$ represents the maximum delay, and t represents the predetermined time duration. Based on the inequation, it may be ensured that the synchronization state is detected in time, and it may be ensured that the synchronization detection is not to be performed too frequently to reduce power consumption.

It should be understood that the method in the embodiment further includes the following operations. In a case that the synchronization state is a synchronous state, a state of the wireless earphones is determined, and an operation corresponding to the state is performed. The state of the wireless earphones includes an entering-ear state, a leaving-ear state, an in-box state and a leaving-box state. It should be understood that in a case that the wireless earphones have been connected to a terminal, the wireless earphones are in an idle state and waits for an instruction from the terminal.

In a case that the state is the entering-ear state, the step of performing an operation corresponding to the state includes: playing an audio and outputting the audio through the wireless earphones; or outputting a call signal through the wireless earphones and turning on a microphone of the wireless earphones. In implementations, an operation corresponding to the entering-ear state may be playing an audio and outputting the audio through the wireless earphones. The audio may be music or the like. The call may be controlled based on the state of the wireless earphones. In a case that the earphones are in the entering-ear state, the call is performed at the earphones, that is, the call signal is outputted from the wireless earphones and the microphone in the wireless earphones is turned on. Apparently, automatic answering of a call may be controlled based on the state of the wireless earphones. The user may perform configuration on the terminal to automatically answer a call in a case that the earphones are in the entering-ear state, which is not limited herein.

In a case that the state is the leaving-ear state, the step of performing an operation corresponding to the state includes: pausing an audio; or outputting a call signal through a speaker of the terminal corresponding to the wireless earphones, and turning on a microphone of the terminal. In implementations, the operation corresponding to the leaving-ear state may be pausing an audio. The call may be controlled based on the state of the wireless earphones. In a case that the wireless earphones are in the leaving-ear state, the call is performed at the terminal, that is, the call signal is outputted from the loudspeaker of the terminal and the microphone of the terminal is turned on.

In a case that the state is the entering-box state, the performing an operation corresponding to the state includes performing a disconnection operation on the wireless earphones. In a case that the state is the leaving-box state, the performing an operation corresponding to the state includes performing a connection operation on the wireless earphones. In implementations, in a case that the left earphone serves as a master earphone in the wireless earphones, that is, the left earphone is connected to a terminal and the right earphone is connected to the left earphone to acquire information of the terminal, the disconnection operation when the right earphone is putted into the box is disconnecting the left earphone and the right earphone, and the disconnection operation when the left earphone is putted into the box is disconnecting the left earphone from the terminal and the right earphone. The earphones, after being putted into the box, are charged. In a case that the state is the leaving-box state, the master earphone and the terminal are connected, and the left earphone and the right earphone are connected.

In the method for performing synchronization detection on wireless earphones according to the embodiments of the present disclosure, when the wireless earphones trigger a target action, synchronization detection is performed, that is, a synchronization state between a left earphone and a right earphone is acquired. In a case that the left earphone and the right earphone are not synchronized, polling is performed. Synchronization detection is performed every predetermined time duration until the left earphone and the right earphone are synchronized. Therefore, with the method for performing synchronization detection on wireless earphones according to the embodiments of the present disclosure, the problem of wearing detection failure caused by the delay of synchronization of the left earphone and the right earphone in wearing is solved, ensuring that the synchronization detection can be realized in one wearing process, improving the accuracy of detecting the synchronization state between the left earphone and the right earphone, and thereby improving the user experience.

A method for performing synchronization detection on wireless earphones is provided according to another embodiment of the present disclosure. Compared with the previous embodiment, the technical solutions are further explained and optimized in the embodiment.

Figure 2:
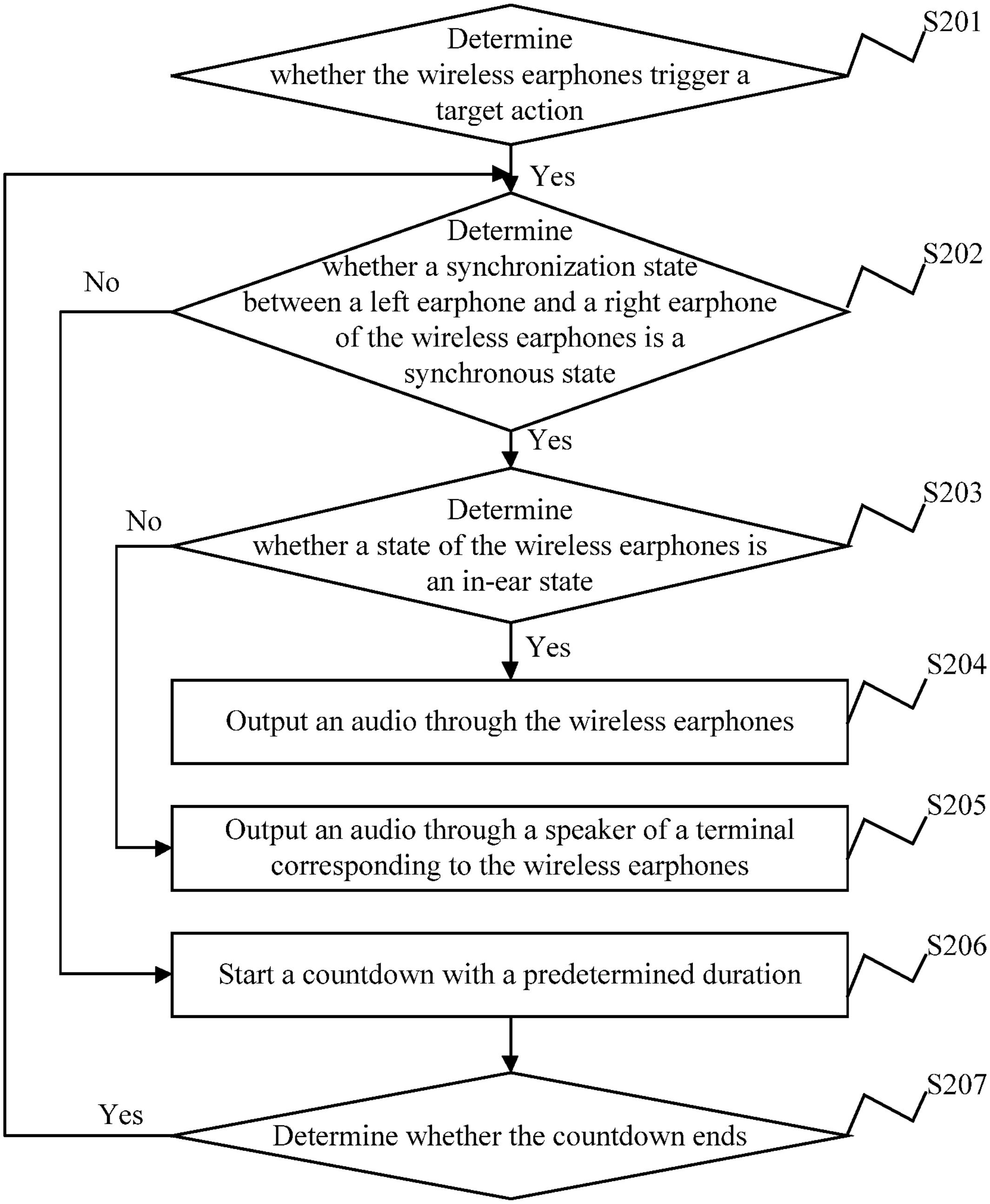
FIG. 2 is a flowchart of a method for performing synchronization detection on wireless earphones according to another exemplary embodiment.

Reference is made to FIG. 2, which shows a flowchart of a method for performing synchronization detection on wireless earphones according to another exemplary embodiment. As shown in FIG. 2, the method includes the following steps S201 to S207.

In step S201, it is determined whether the wireless earphones trigger a target action. In a case that the wireless earphones trigger the target action, proceed to step S202.

In step S202, it is determined whether a synchronization state between a left earphone and a right earphone of the wireless earphones is a synchronous state. In a case that the synchronization state between the left earphone and the right earphone is the synchronous state, proceed to step S203. In a case that the synchronization state between the left earphone and the right earphone is not the synchronous state, proceed to step S206.

In step S203, it is determined whether a state of the wireless earphones is an in-ear state. In a case that the state of the wireless earphones is the in-ear state, proceed to step S204. In a case that the state of the wireless earphones is not the in-ear state, proceed to step S205.

In step S204, an audio is outputted through the wireless earphones.

In step S205, an audio is outputted through a speaker of a terminal corresponding to the wireless earphones.

In step S206, a countdown with a predetermined time duration is started.

In step S207, it is determined whether the countdown ends. In a case that the countdown ends, proceed to step S202.

A device for performing synchronization detection on wireless earphones according to an embodiment of the present disclosure is described below. The device for performing synchronization detection on wireless earphones described below and the method for performing synchronization detection on wireless earphones described above may be cross-referenced.

Figure 3:
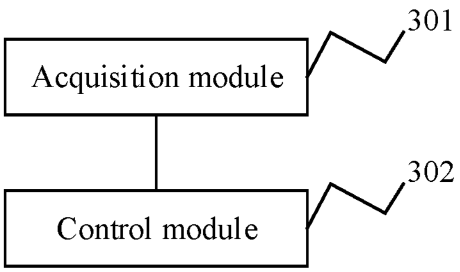
FIG. 3 is a schematic structural diagram of a device for performing synchronization detection on wireless earphones according to an exemplary embodiment.

Reference is made to FIG. 3, which shows a schematic structural diagram of a device for performing synchronization detection on wireless earphones according to an exemplary embodiment. As shown in FIG. 3, the device includes an acquisition module 301 and a control module 302.

The acquisition module 301 is configured to acquire a synchronization state between a left earphone and a right earphone of the wireless earphones when the wireless earphones trigger a target action. The target action includes any one of: entering a box, leaving a box, entering an ear, leaving an ear and connecting to a terminal.

The control module 302 is configured to start a countdown with a predetermined time duration in a case that the synchronization state is a non-synchronous state, and trigger the acquisition module to perform operations when the countdown ends.

In the device for performing synchronization detection on wireless earphones according to the embodiments of the present disclosure, when the wireless earphones trigger a target action, synchronization detection is performed, that is, a synchronization state between a left earphone and a right earphone is acquired. In a case that the left earphone and the right earphone are not synchronized, polling is performed. Synchronization detection is performed every predetermined time duration until the left earphone and the right earphone are synchronized. Therefore, with the device for performing synchronization detection on wireless earphones according to the embodiments of the present disclosure, the problem of wearing detection failure caused by the delay of synchronization of the left earphone and the right earphone in wearing is solved, ensuring that the synchronization detection can be realized in one wearing process, improving the accuracy of detecting the synchronization state between the left earphone and the right earphone, and thereby improving the user experience.

Based on the above embodiments, as a preferred embodiment, the device further includes an execution module.

The execution module is configured to, in a case that the synchronization state is a synchronous state, determine a state of the wireless earphones and perform an operation corresponding to the state.

Based on the above embodiments, as a preferred embodiment, in a case that the state is an entering-ear state, the execution module is configured to output an audio through the wireless earphones; and in a case that the state is a leaving-ear state, the execution module is configured to output an audio through a speaker of a terminal corresponding to the wireless earphones.

Based on the above embodiments, as a preferred embodiment, in a case that the state is an entering-box state, the execution module is configured to perform a disconnection operation on the wireless earphones; and in a case that the state is a leaving-box state, the execution module is configured to perform a connection operation on the wireless earphones.

Based on the above embodiment, as a preferred embodiment, the device further includes a first determination module and a second determination module.

The first determination module is configured to determine a maximum delay and a minimum delay for the synchronization detection.

The second determination module is configured to determine the predetermined time duration based on the maximum delay and the minimum delay.

Based on the above embodiments, as a preferred embodiment, the second determination module is configured to determine the predetermined time duration based on a predetermined inequation. The predetermined inequation is expressed as:

$$\frac{T_{min}}{2} \leq t \leq \frac{T_{max}}{2}$$

where $T_{min}$ represents the minimum delay, $T_{max}$ represents the maximum delay, and t represents the predetermined time duration.

For the device according to the embodiments described above, the manners in which the modules perform operations have been described in detail in the method embodiments, and the manners are not described in detail herein.

Figure 4:
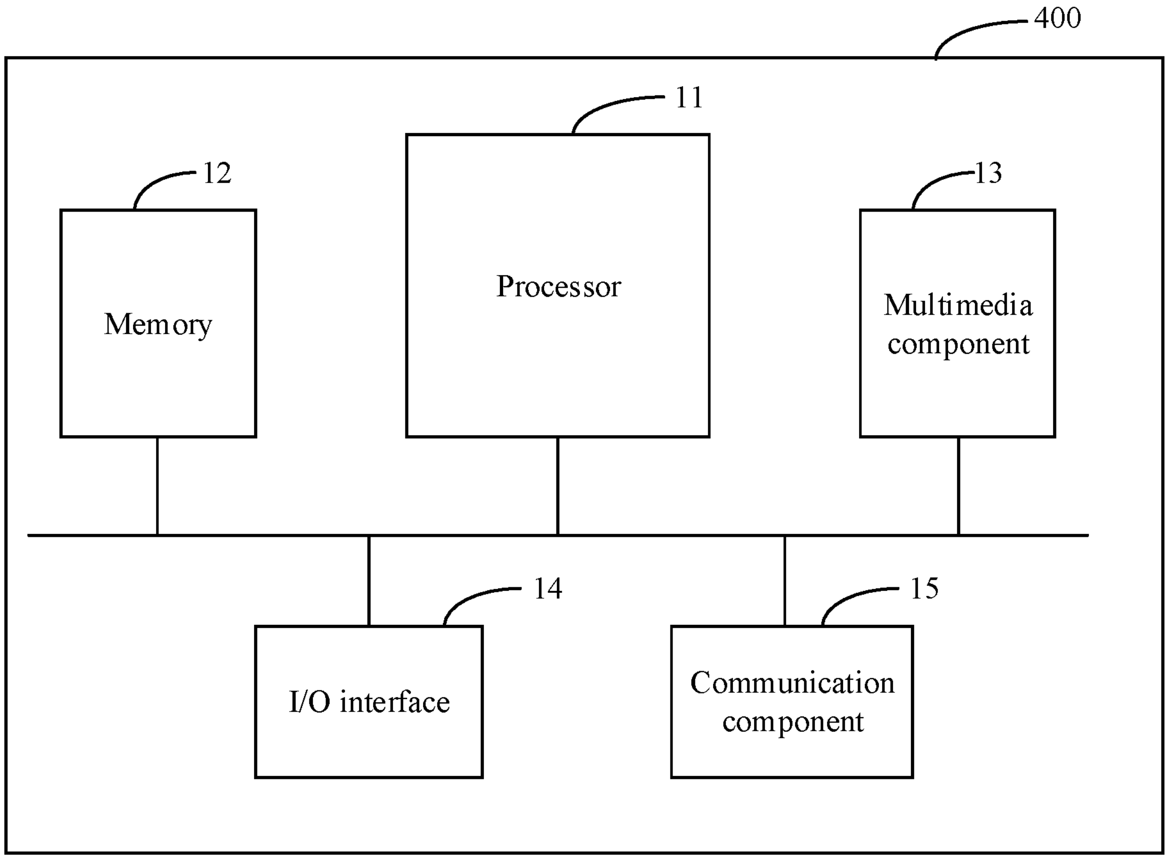
FIG. 4 is a schematic structural diagram of wireless earphones according to an exemplary embodiment.

Wireless earphones are further provided according to the present disclosure. Reference is made to FIG. 4, which shows a schematic structural diagram of wireless earphones 400 according to an embodiment of the present disclosure. As shown in FIG. 4, the wireless earphones 400 may include a processor 11 and a memory 12. The wireless earphones 400 may further include one or more of a multimedia component 13, an input/output (I/O) interface 14, and a communication component 15.

The processor 11 is configured to control an overall operation of the wireless earphones 400 to perform all or a part of steps of the method for performing synchronization detection on wireless earphones. The memory 12 stores various types of data to support the operation of the wireless earphones 400. The data may include, for example, instructions of any application program or method to be operated on the wireless earphones 400, and include application program-related data, such as contact data, transmitted and received messages, pictures, audios, and videos. The memory 12 may be implemented by any type of volatile or non-volatile memory device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc. The multimedia component 13 may include a screen and an audio component. The screen may be, for example, a touch screen. The audio component is configured to output and/or input an audio signal. For example, the audio component may include a microphone for receiving an external audio signal. The received audio signal may be stored in the memory 12 or be transmitted by the communication component 15. The audio component further includes at least one speaker for outputting an audio signal. The I/O interface 14 provides interfaces between the processor 11 and other interface modules. The other interface modules may be a keyboard, a mouse, a button and the like. The button may be a virtual button or a physical button. The communication component 15 is used for wired communication or wireless communication between the wireless earphones 400 and other devices. The wireless communication may be based on, for example, Wi-Fi technology, Bluetooth technology, near field Communication (NFC), 2G, 3G or 4G, or a combination thereof. Therefore, the communication component 15 may include a Wi-Fi module, a Bluetooth module, and an NFC module.

In an exemplary embodiment, the wireless earphones 400 may be implemented by one or more of an application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components, to perform the method for performing synchronization detection on wireless earphones.

In another exemplary embodiment, a computer readable storage medium storing program instructions is further provided. The program instructions, when executed by a processor, cause the processor to perform the method for performing synchronization detection on wireless earphones. For example, the computer readable storage medium may be the memory 12 storing program instructions. The program instructions may be executed by the processor 11 of the wireless earphones 400 to perform the method for performing synchronization detection on wireless earphones.

The embodiments in this specification are described in a progressive way, each of which emphasizes the differences from others, and for the same or similar parts among the embodiments can be referred to each other. Since the device disclosed in the embodiments corresponds to the method therein, the description thereof is relatively simple, and for relevant matters, one may refer to the description of the method. It should be noted that for those skilled in the art, improvements and modifications may be made to the present disclosure without departing from the concept of the present disclosure. These improvements and modifications shall fall within the protection scope of the claims of the present disclosure.

It should be noted that in the present disclosure, the relationship terms such as "first" and "second" are merely used for distinguishing one entity or operation from another, rather than indicating or implying that the actual relationship or order exists between these entities or operations. In addition, in this specification, terms of "include", "comprise" or any other variants are intended to be non-exclusive. Therefore, a process, a method, an article or a device including multiple elements includes not only the elements but also other elements that are not enumerated, or also includes the elements inherent in the process, method, article or device. Unless expressively limited otherwise, the statement "comprising (including) one . . . " does not exclude the case that other similar elements may exist in the process, method, article or device.

The invention claimed is:

1. A method for performing synchronization detection on wireless earphones, comprising:

acquiring a synchronization state between a left earphone and a right earphone of the wireless earphones when the wireless earphones trigger a target action, wherein the target action comprises any one of: entering a box, leaving a box, entering an ear, leaving an ear and connecting to a terminal;

starting a countdown with a predetermined time duration in a case that the synchronization state is a non-synchronous state;

acquiring the synchronization state between the left earphone and the right earphone of the wireless earphones when the countdown ends; and in a case that the synchronization state is a synchronous state, determining a state of the wireless earphones and performing an operation corresponding to the state, wherein the state of the wireless earphones comprises an entering-ear state, a leaving-ear state, an in-box state and a leaving-box state, and in a case that the wireless earphones have been connected to a terminal, the wireless earphones are in an idle state and waits for an instruction from the terminal, determining a maximum delay and a minimum delay for the synchronization detection; and determining the predetermined time duration based on the maximum delay and the minimum delay, wherein the determining the predetermined time duration based on the maximum delay and the minimum delay comprises:

determining the predetermined time duration based on a predetermined inequation, wherein the predetermined inequation is expressed as:

$$\frac{T_{min}}{2} \leq t \leq \frac{T_{max}}{2}$$

where $T_{min}$ represents the minimum delay, $T_{max}$ represents the maximum delay, and t represents the predetermined time duration.

2. Wireless earphones, comprising:

a memory, storing a computer program; and a processor, configured to perform, when executing the computer program, the method for performing the synchronization detection on the wireless earphones according to claim 1.

3. A non-transitory computer readable storage medium storing a computer program, wherein the computer program, when executed by a processor, causes the processor to perform the method for performing the synchronization detection on the wireless earphones according to claim 1.

* * * * *